United States Patent
Kam

(10) Patent No.: US 12,272,976 B1
(45) Date of Patent: Apr. 8, 2025

(54) DEVICE AND METHOD FOR SUPPLYING ELECTRIC POWER FROM A PRIMARY ELECTRONIC DEVICE TO A SECONDARY ELECTRONIC DEVICE

(71) Applicant: Geotab Inc., Oakville (CA)

(72) Inventor: Tessa Kam, Oakville (CA)

(73) Assignee: Geotab Inc., Oakville (CA)

(*) Notice: Subject to any disclaimer, the term of this patent is extended or adjusted under 35 U.S.C. 154(b) by 0 days.

(21) Appl. No.: 18/679,636

(22) Filed: May 31, 2024

Related U.S. Application Data

(60) Provisional application No. 63/642,156, filed on May 3, 2024.

(51) Int. Cl.
  *H02J 7/00* (2006.01)
  *H02J 7/34* (2006.01)
  *B60R 16/02* (2006.01)

(52) U.S. Cl.
  CPC ........ *H02J 7/0042* (2013.01); *H02J 7/00304* (2020.01); *H02J 7/00714* (2020.01); *H02J 7/007182* (2020.01); *H02J 7/345* (2013.01); *B60R 16/0207* (2013.01); *H02J 2207/50* (2020.01); *H02J 2310/40* (2020.01)

(58) Field of Classification Search
  CPC .. H02J 7/0042; H02J 7/00304; H02J 7/00714; H02J 7/007182; H02J 7/345; H02J 2207/50; H02J 2310/40; B60R 16/0207
  USPC .................. 320/107, 140, 163, 164
  See application file for complete search history.

(56) References Cited

U.S. PATENT DOCUMENTS

| | | | |
|---|---|---|---|
| 7,759,907 B2 * | 7/2010 | Ferguson | H02J 7/007182 320/163 |
| 2008/0160370 A1 * | 7/2008 | Masse | H01M 16/006 429/432 |
| 2010/0265628 A1 * | 10/2010 | Blinder | H02J 1/108 320/137 |
| 2016/0233719 A1 * | 8/2016 | Guckin | H02J 7/0068 |

* cited by examiner

*Primary Examiner* — Edward Tso
*Assistant Examiner* — Aaron Piggush
(74) *Attorney, Agent, or Firm* — Sherif A. Abdel-Kader

(57) ABSTRACT

An electric harness for supplying electric power from a primary electronic device to a secondary electronic device that makes inrush current demands. The electric harness includes a main branch with a current limiter, and a secondary branch with an electric energy storage device. When the secondary electronic device makes an inrush current demand, the electric energy storage device supplies an auxiliary electric current in the auxiliary branch which when added to a main current in the main branch, meets the inrush current demands.

11 Claims, 8 Drawing Sheets

DEVICE AND METHOD FOR SUPPLYING ELECTRIC POWER FROM A PRIMARY ELECTRONIC DEVICE TO A SECONDARY ELECTRONIC DEVICE

RELATED APPLICATIONS

This application claims priority from U.S. provisional application 63/642,156 filed on May 3, 2024, the contents of which are herein incorporated by reference.

FIELD

The present disclosure generally relates to electronic devices and more specifically to a device and a method for supplying electric power from a primary electronic device to a secondary electronic device.

BACKGROUND

An electronic system may comprise a primary electronic device and a secondary electronic device. In this disclosure, the primary electronic device is powered by a power source, while the secondary electronic device is not powered by a power source. Instead, the primary electronic device supplies electric power to the secondary electronic device, for example via an electric harness that connects the primary electronic device and the secondary electronic device.

The secondary electronic device may, in some cases, draw a brief inrush of electric current for a limited time, the brief inrush of electric current being in excess of the normal current that the primary electronic device can supply. This case is particularly plausible in cases where the secondary device has an electromechanical module, such as a direct current (DC) motor. An electromechanical module, such as a DC motor, draws a brief inrush of electric current as they are activated. In some instances the brief inrush of electric current drawn by the secondary electronic device from the primary electronic device causes a power protection module to experience an overcurrent condition. In some cases, in response to the overcurrent condition, the primary electronic device may be damaged. In other cases, in response to the overcurrent condition, the primary electronic device may disconnect the power supplied to the secondary electronic device in order to avoid damage as a result of the overcurrent condition. Specifically, the power protection module of the primary electronic device may comprise an electronic fuse configured to disconnect power in the case of an overcurrent condition. Disconnecting power to the secondary electronic device causes the secondary electronic device to fail to perform a particular function that it was intended to perform. In some applications, a failure of the secondary electronic device to perform one or more of its functions can have a catastrophic effect.

SUMMARY

In one aspect of the present disclosure, there is provided an electric harness for connecting a primary electronic device to a secondary electronic device. The electric harness comprises a main branch and an auxiliary branch. The main branch comprises a supply end for electrically connecting the electric harness to the primary electronic device, a load end for electrically connecting the electric harness to the secondary electronic device, an electronic current limiter configured to limit a main electric current supplied by the primary electronic device via the supply end on the main branch to a main current limit, and a main one-way switch configured for passing the main electric current from the electronic current limiter to the load end. The auxiliary branch is in parallel with the main branch and connected thereto at the supply end and the load end. The auxiliary branch comprises an electric energy storage device and an auxiliary one-way switch connecting the electric energy storage device to the load end. The auxiliary one-way switch is configured to operate in a first mode in which the auxiliary one-way switch is open and a second mode in which the auxiliary one-way switch is closed allowing an auxiliary electric current supplied by the electric energy storage device to flow to the load end while blocking the main electric current from flowing through the auxiliary branch. Advantageously, the electric harness can supply current to the secondary electronic device up to the main current limit when the auxiliary one-way switch is in the first mode, and can supply additional auxiliary electric current when the auxiliary one-way switch is in the second mode.

The main current limit may comprise an overcurrent limit associated with a power protection module of the primary electronic device. Advantageously, the power protection module of the primary electronic device does not trip and disconnect the secondary electronic device.

The main one-way switch may be further configured to block the auxiliary electric current from flowing through the main branch.

The main one-way switch is integrated with the electronic current limiter. Using a single part that can perform both the function of the electronic current limiter and the one-way switch limits the part count and simplifies the design of the electric harness.

The supercapacitor may have a capacitance enabling the supercapacitor to supply the auxiliary electric current for a limited duration. A smaller capacitance has the advantage of a small size capacitor enabling the electric harness design to be sleek and portable.

The auxiliary one-way switch may be configured to switch from the first mode to the second mode in response to the secondary electronic device drawing a load current at the load end, which is in excess of the main current limit. Advantageously, the auxiliary branch is not connected to the load until the secondary electronic device demands a load current that is in excess of the main electric current limit.

The electric energy storage device may be configured to provide the auxiliary electric current such that the main electric current and the auxiliary electric current together are equal to the load current. Advantageously, the demand of the secondary electronic device of a load current is met by both the main electric current and the auxiliary electric current.

The auxiliary one-way switch may be configured for switching from the first mode to the second mode when an output voltage at the load end has dropped below a low output voltage limit and switching from the second mode to the first mode when the output voltage at the load end rises above the low output voltage limit. Advantageously, the electric harness detects the condition under which the auxiliary electric current needs to be supplied to the load in addition to the main electric current. Furthermore, when the secondary electronic device no longer needs the extra current from the auxiliary branch, the auxiliary one-way switch disconnects the auxiliary branch.

The auxiliary one-way switch may comprises an ideal diode configured for switching on when a load voltage at the load end is lower than an electric energy storage device voltage of the electric energy storage device and switching off when the load voltage at the load end is higher than the electric energy storage device voltage. The use of an ideal diode has the advantage of a low voltage drop on the auxiliary branch when the ideal diode is on, and a very low reverse current when the ideal diode is off.

The auxiliary branch may further comprise a voltage downconverter configured for down-converting a supply voltage at the supply end to a supercapacitor voltage used by the charging module to charge the supercapacitor and a voltage upconverter for up-converting the supercapacitor voltage to a load voltage supplied at the load end. Advantageously, using a voltage downconverter in the auxiliary branch to down-convert the supply voltage allows the use of a smaller supercapacitor thus reducing the size of the electric harness making it sleek and portable.

The charging module may be configured for down-converting a supply voltage at the supply end to a supercapacitor voltage suitable for the supercapacitor and the auxiliary branch further comprises a voltage upconverter for up-converting the supercapacitor voltage to a load voltage supplied at the load end. Using a charging module that also provides voltage down-conversion reduces the part count in the electric harness making it sleeker and more portable.

In another aspect of the present disclosure, there is provided a method of supplying electric power from a primary electronic device to a secondary electronic device coupled to the primary electronic device via an electric harness comprised of a main branch and an auxiliary branch. The method comprises limiting a main electric current on the main branch to a main current limit and in response to detecting that the secondary electronic device is drawing a load current which is in excess of the main current limit supplying an auxiliary electric current by an electric energy storage device in the auxiliary branch to the secondary electronic device.

Limiting the main electric current to the main current limit may comprise limiting the main electric current to an overcurrent limit associated with a power protection module of the primary electronic device. Advantageously, the power protection module of the primary electronic device does not experience an overcurrent condition causing the power protection module to disconnect power from the secondary electronic device. This averts any consequences that may result from disconnecting power to the secondary electronic device.

Detecting that the secondary electronic device is drawing the load current which is in excess of the main electric current ma comprise detecting that an output voltage at a load end of the electric harness has dropped below a low output voltage limit.

Supplying the auxiliary electric current may comprise closing an auxiliary one-way switch thus connecting the electric energy storage device to the secondary electronic device.

The method may further comprise blocking the auxiliary electric current from flowing through the main branch and blocking the main electric current from flowing through the auxiliary branch.

The electric energy storage device may comprise a supercapacitor and the method may further comprising charging the supercapacitor in response to connecting the electric harness to the primary electronic device.

Supplying the auxiliary electric current may comprise discharging the supercapacitor.

The method may further comprise down-converting in the auxiliary branch a supply voltage at a supply end of the electric harness to a supercapacitor voltage used by a charging module for charging the supercapacitor and up-converting in the auxiliary branch the supercapacitor voltage to a load voltage supplied at a load end of the electric harness.

In any of the preceding aspects, the electric energy storage device may comprise a battery. A battery is useful in applications where an inrush current demand is sustained for long durations such that a capacitor or a supercapacitor would be inadequate.

In any of the preceding aspects, the electric energy storage device may comprise a supercapacitor and the auxiliary branch may further comprise a charging module configured for charging the supercapacitor. For applications where a brief inrush current demand is expected, a supercapacitor and a charging module are appropriate since a supercapacitor does not need to be replaced as in the case of a non-rechargeable battery. Furthermore charging a supercapacitor is significantly faster than charging a battery.

BRIEF DESCRIPTION OF THE DRAWINGS

Exemplary non-limiting embodiments of the present disclosure are described with reference to the accompanying drawings in which.

DETAILED DESCRIPTION

The present disclosure relates to an electronic device for supplying electric power from a primary electronic device to a secondary electronic device that demands a short burst ("inrush") of electric current which is higher than what the primary electronic device can supply. In some implementations, the electronic device for supplying electric power from the primary electronic device to the secondary electronic device comprises an electric harness for connecting the primary electronic device to the secondary electronic device and supplying power thereto. The present disclosure also relates to a method of supplying power from a primary electronic device to a secondary electronic device and handling a brief inrush of electric current by the secondary electronic device that is higher than what the primary electronic device can supply.

Figure 1:
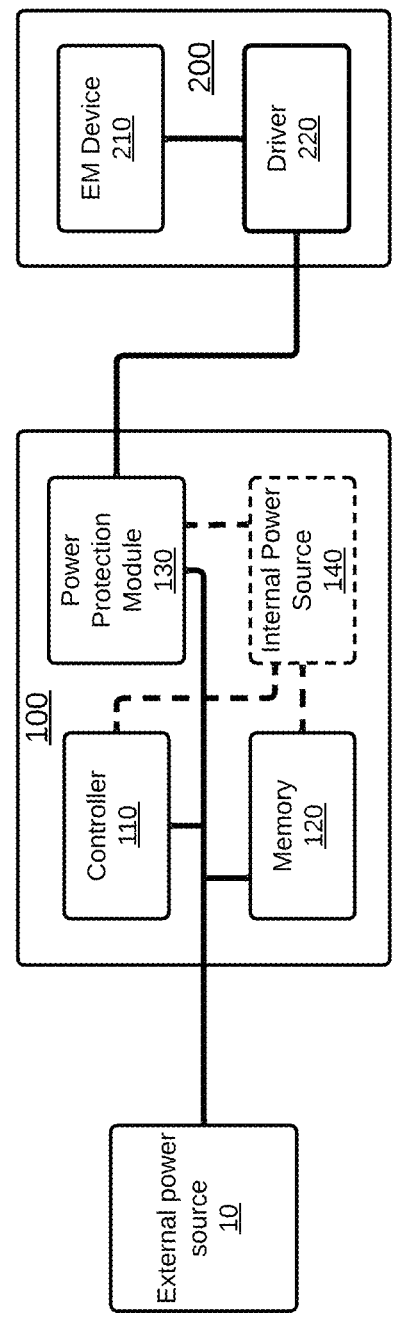
FIG. 1 is a block diagram depicting an electronic system comprising a primary electronic device powered by a power source, and a secondary electronic device powered by the primary electronic device.

FIG. 1 depicts a system comprised of an external power source 10, a primary electronic device 100, and a secondary electronic device 200.

In this disclosure, an "external power source" refers to a device or a system that provides direct current (DC) electrical energy to power electronic devices or systems. The external power source 10 may comprise one or more of an alternative current (AC)/DC adapter or power supply, an external battery, a power bank, or an electric energy harvester such as a solar panel or a wind turbine.

In this disclosure, a "primary electronic device" refers to an electronic device powered by an electric power source and provides electric power to a secondary electronic device and is capable of powering on and powering off that secondary electronic device. In the depicted implementation, the primary electronic device 100 has a controller 110, a memory 120, a power protection module 130, and optionally an internal power source 140.

The controller 110 may include one or any combination of a processor, a microprocessor, a microcontroller (MCU), a central processing unit (CPU), a System-on-Chip (SOC), a processing core, a state machine, a logic gate array, an application-specific integrated circuit (ASIC), a field-programmable gate array (FPGA), or any other hardware component or combination of hardware components capable of executing machine-executable programming instructions. The controller 110 may follow a Von Neumann Architecture, a Harvard Architecture, or a Modified Harvard Architecture. The controller 110 may be a Complex Instruction Set Computer (CISC) processor supporting a complex instruction set that can perform multiple operations in a single instruction. Alternatively, the controller 110 may be a Reduced Instruction Set Computer (RISC) processor having a simplified and streamlined instruction set, and employs a pipeline architecture to optimize execution. The controller 110 may have a single processor core or multiple processor cores supporting parallel execution of instructions. The controller 110 may have an internal memory for storing machine-executable programming instructions to be executed by the controller 110 to carry out the steps of the methods described in this disclosure.

The memory 120 is an electronic storage component that enables storage of data and machine-executable programming instructions. The memory 120 may be a read-only-memory (ROM) including a Programmable ROM (PROM), and Erasable Programmable ROM (EPROM), Electrically Erasable Programmable ROM (EEPROM), or Flash memory. The memory 120 may be a random access memory (RAM) including Static RAM (SRAM) and Dynamic RAM (DRAM). Alternatively, the memory 120 may be a Ferroelectric RAM (FRAM), a Magnetic Random Access Memory (MRAM), or a Phase-Change Memory (PCM). The memory 120 may also be any combination of the aforementioned types. The memory 120 is for storing machine-executable programming instructions and/or data to support the functionality described in this disclosure. The memory 120 is coupled to the controller 110, via a memory bus, thus enabling the controller 110 to execute the machine-executable programming instructions stored in the memory 120 and to access the data stored therein.

In this disclosure, a "power protection module" is an electronic module aimed at handling power faults in an electronic circuit. Power faults include overcurrent, overvoltage, and overcurrent conditions. An electronic fuse ("eFuse") is one example of a power protection module. An "eFuse" is an integrated power path protection device that is used to limit circuit currents and voltages to safe levels during fault conditions. As an example, the TPS1663x from Texas Instruments™ is an eFuse that provides protection for a load against overcurrent conditions, fast short circuit conditions, overvoltage conditions, and undervoltage conditions. As another example, the MAX1457x from Analog Devices™ is an adjustable overvoltage and overcurrent protection device for protecting systems against positive voltage faults and negative input voltage faults, and also provides current-limit protection. The power protection module 130 is similar to the aforementioned protection modules. Like most power protection modules, the power protection module 130 limits current passing therethrough once such current reaches a particular threshold, referred to in this disclosure as the "overcurrent limit". When the overcurrent limit is reached, the power protection module keeps current passing therethrough at the overcurrent limit until one of two possible events take place. The first possibility is that the power protection module 130 experiences an overheating condition causing the power protection module 130 to enter "thermal shutdown". In thermal shutdown, the power protection module 130 operates in either auto-retry mode or latch-off mode. In auto-retry mode, the power protection module 130 breaks the circuit, reconnects the load, then checks whether the overcurrent protection has gone away. Alternatively, in thermal shutdown, the power protection module 130 operates in latch-off mode in which the load is permanently disconnected. The second possibility is that the power protection module 130 may be configured to start a timer once the overcurrent limit is reached. If the overcurrent condition persists until the timer expires, the power protection module 130 generates an event, such as asserting a fault signal which can be detected by the controller 110. In this case, the controller 110 may execute machine-executable programming instructions which configure the power protection module 130 to break the circuit thus disconnecting the load from the primary electronic device 100.

The internal power source 140 is an optional component within the primary electronic device 100 that provides electric power. Examples include batteries, rechargeable batteries, fuel cells, and energy harvesters such as solar panels and wind turbines. In various implementations, the primary electronic device 100 may be powered by the external power source 10 only, the internal power source 140 only, or a combination of both.

In this disclosure, "a secondary electronic device" refers to an electronic device or a load, which is not powered on its own and receives power from a primary electronic device. The secondary electronic device 200 may be a peripheral device that contains additional components that the primary electronic device 100 lacks for the purpose of expanding the capabilities of the primary electronic device 100. In some implementations, that secondary electronic device 200 contains an electromechanical device ("EM device") 210 and a driver 220. The EM device 210 comprises a device that utilizes electromagnetism for operation, such as relays, electric motors, solenoids, actuators, servo motors, stepper motors, electromechanical timers, and buzzers. In this disclosure a "driver" refers to an electronic component that receives power and control signals from a primary device and uses the power and control signals to control the EM device 210.

Figure 2:
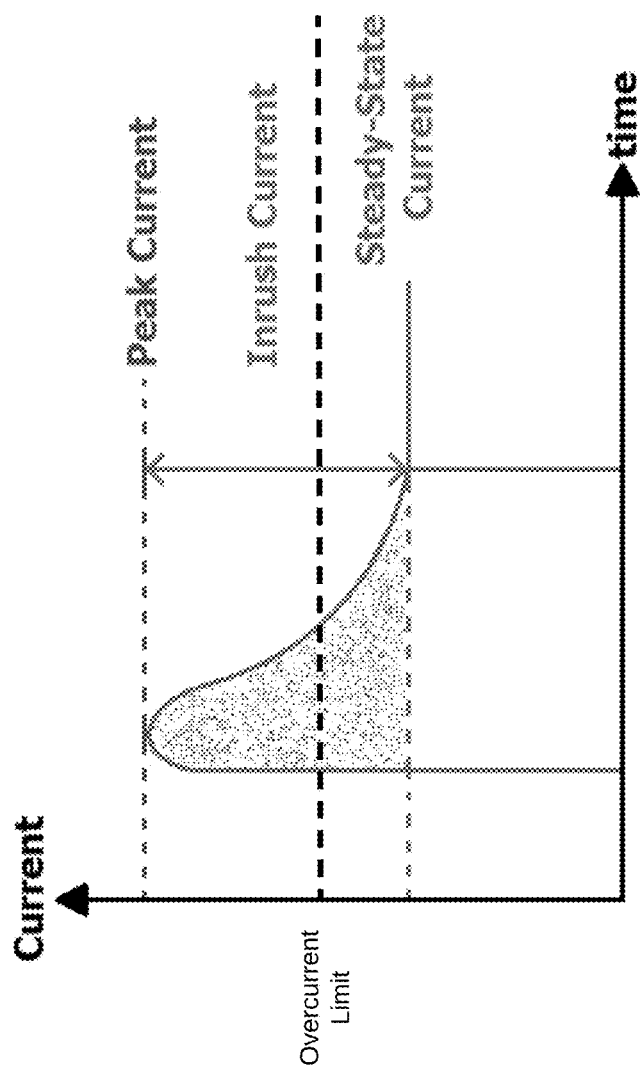
FIG. 2 is a graph showing the electric current in an electromechanical device experience an inrush current demand.

In operation, the primary electronic device 100 draws power from the external power source. Initially, the secondary electronic device 200 is powered off. At some point, the primary electronic device 100 executes machine-executable programming instructions which configure the power protection module 130 to begin supplying power to the secondary electronic device 200 for powering up the secondary electronic device 200. Alternatively, the secondary electronic device 200 may contain other components which were initially powered up, and the primary electronic device 100 configures the power protection module to send control signals that cause the driver to power up the electromagnetic device ("EM device") 210. The EM device 210 may be a DC motor which is characterized by drawing an inrush current when it is first started, then draws a steady-state current after it has started. The inrush current rises quickly until it reaches a peak current, then decays until it drops down to a steady-state current. This is depicted in FIG. 2.

A problem arises when the inrush current drawn by the EM device 210 or the driver 220 (generally by the secondary electronic device 200) exceeds the overcurrent limit of the power protection module 130 of the primary electronic device 100. As shown in FIG. 2, the overcurrent limit is higher than the steady-state current drawn by an electromechanical device, such as a DC motor. However, the inrush reaches values which are above the overcurrent limit. As discussed above, the power protection module 130 limits the current supplied to the secondary electronic device 200 to the overcurrent limit of the power protection module 130. Additionally, if the secondary electronic device 200 continues to draw current, which is greater than the overcurrent limit, the power protection module 130 may enter into thermal shutdown or latch off thus permanently disconnecting power from the secondary electronic device 200. The secondary electronic device 200 may be tasked with a critical task that must always work. As such disconnecting power from the secondary electronic device 200 in response to an overcurrent condition at the power protection module 130 of the primary electronic device 100 is not acceptable.

A first solution to the aforementioned problem would be to configure the power protection module 130 of the primary electronic device 100 with a higher overcurrent limit. For example, a power protection module 130 such as an eFuse or an overcurrent protection device typically configures the overcurrent limit by varying a resistor that connects between one of the pins thereof and ground. While this solution works for newly manufactured primary electronic devices 100, it is not a viable solution if there are thousands of primary electronic devices 100 already deployed in the field. Such devices cannot be re-configured to have a higher overcurrent limit, specifically an overcurrent limit that can accommodate the peak current demanded by the secondary electronic device 200.

A second solution to the aforementioned problem would be to configure the driver 220 to limit the current drawn by the EM device 210 of the secondary electronic device 200 so that it is lower than the overcurrent limit of the power protection module 130 of the primary electronic device 100. There are, however, some difficulties with this second solution. Firstly, there may already be thousands of the secondary electronic devices 200 in the field and hence cannot be modified to draw current that does not exceed the overcurrent limit of the power protection module 130 of the primary electronic device 100. Secondly, the EM device 210 may not work correctly or at all if the current supplied to the secondary electronic device 200 is too low. For example, if the EM device 210 is a DC motor, the current supplied to the DC motor may be too low to start the DC motor. As a result, the secondary electronic device 200 does not work properly which may lead to a critical failure in which the secondary electronic device 200 is deployed.

The inventors have invented a new and inventive solution to that aforementioned problem. Specifically, the inventors have devised an electric harness that supplies electric power from a primary electronic device to a secondary electronic device, the electric harness capable of supplying an inrush current for a limited duration to the secondary electronic device. Additionally, the electric harness supplies the inrush current without triggering an overcurrent event with the power protection module 130 of the primary electronic device 100.

Figure 3:
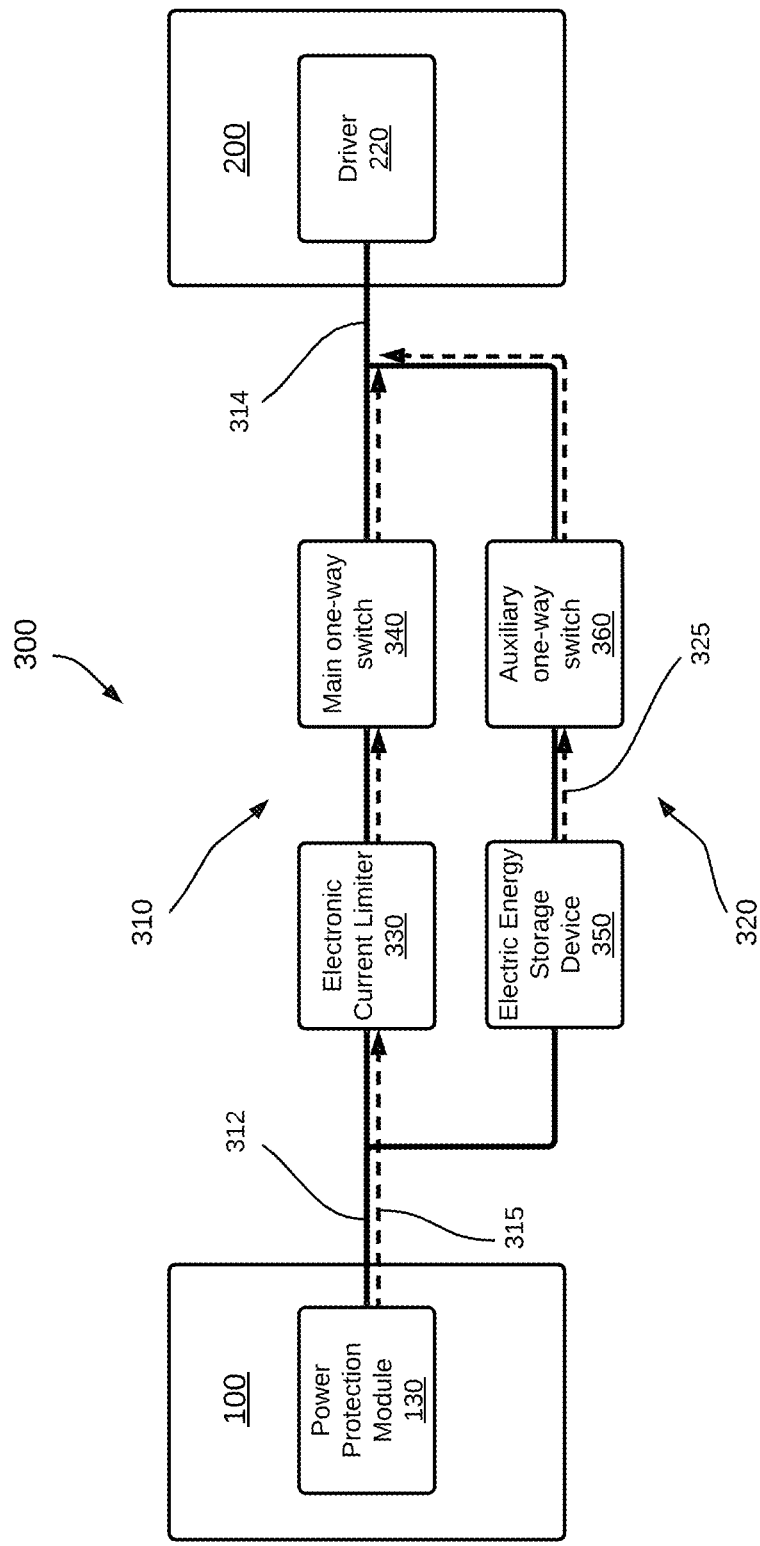
FIG. 3 is a block diagram showing an electric harness coupling a primary electronic device to a secondary electronic device, the electric harness including an electric energy storage device in an auxiliary branch thereof.

In one aspect of the present disclosure an electric harness 300 for connecting a primary electronic device 100 to a secondary electronic device 200 is depicted in FIG. 3. For simplicity, FIG. 3 only shows the power protection module 130 of the primary electronic device 100 and only shows the driver 220 of the secondary electronic device 200. Other components of the primary electronic device 100 and the secondary electronic device 200 are not shown to emphasize the main components which interact with the electric harness 300.

The electric harness 300 comprises a main branch 310 and an auxiliary branch 320.

The main branch 310 has a supply end 312 for electrically connecting the electric harness 300 to the primary electronic device 100. For example, the supply end 312 is shown connected to the power protection module 130 of the primary electronic device 100. The supply end 312 may connect to the primary electronic device 100 using any known form of plug and receptacle arrangement. The main branch 310 also has a load end 314 for electrically connecting the electric harness 300 to the secondary electronic device 200. For example, the load end 314 is shown connected to the driver 220 of the secondary electronic device 200. The load end 314 may be connected to the secondary electronic device 200 using any known form of plug and receptacle arrangement.

The main branch 310 also includes an electronic current limiter 330 configured to limit the main electric current 315 supplied by the primary electronic device via the supply end 312, to a main current limit. An "electronic current limiter" is a circuit or device that limits the amount of current flowing through an electronic circuit to a particular level. Examples of an electronic limiter include a current limiting integrated circuit (IC), operational amplifier-based (op-amp-based) current limiters, and transistor-based current limiters. An electronic current limiter may be a standalone electronic device or part of an electronic device that performs other functions. The main current limit designates the highest current that the main branch 310 will draw from the primary electronic device 100. In some implementations, the main current limit is the overcurrent limit of the power protection module 130 of the primary electronic device 100. Specifically, the main current limit is a current limit that will not cause the power protection module 130 to break the electrical connection that supplies the main electric current 315.

The main branch 310 also includes a main one-way switch 340 configured for passing the main electric current 315 from the electronic current limiter 330 to the load end 314. The main one-way switch 340 is also configured to block any auxiliary electric current 325 on the auxiliary branch 320 from flowing into the main branch 310 at the load end 314.

In some implementations, the electronic current limiter 330 and the main one-way switch 340 are implemented in the same component.

The auxiliary branch 320 is in parallel with the main branch 310. The auxiliary branch 320 is connected to the main branch 310 at the supply end 312 and at the load end 314.

The auxiliary branch 320 includes an electric energy storage device 350, and an auxiliary one-way switch 360 connecting the electric energy storage device 350 to the load end 314.

The electric energy storage device 350 stores electric energy and is capable of releasing such electric energy in the form of the auxiliary electric current 325. The electric energy storage device is configured to provide the auxiliary electric current 325 such that the main electric current and the auxiliary electric current together are equal to the load current. Examples of the electric energy storage device 350 include capacitors, supercapacitors, and batteries.

The auxiliary one-way switch 360 is configured to operate in one of a first mode and a second mode. In the first mode, the auxiliary one-way switch 360 is open and no auxiliary electric current 325 can flow therethrough. As a result no current can flow in the auxiliary branch 320. In the second mode, the auxiliary one-way switch 360 is closed allowing the auxiliary electric current 325 supplied by the electric energy storage device 350 to flow through the auxiliary branch 320 to the load end 314. The auxiliary one-way switch 360 is configured to switch from the first mode to the second mode in response to the secondary electronic device 200 drawing a load current at the load end 314, which is in excess of the main electric current 315. When the secondary electronic device 200 draws a load current which is in excess of the main electric current 315, this is accompanied by a drop in voltage at the load end. The auxiliary one-way switch 360 is further configured to block the main electric current 315 from flowing through the auxiliary branch 320.

The electric harness 300 of FIG. 3 supplies the main electric current 315 provided by the primary electronic device 100 via the main branch 310 to the secondary electronic device 200 at all times. When there is an inrush current demand by the secondary electronic device 200, the auxiliary one-way switch 360 switches from the first mode to the second mode thus allowing the auxiliary electric current 325 to flow through the auxiliary branch 320 to the secondary electronic device 200. Advantageously, since the auxiliary electric current 325 is provided by the electric energy storage device 350 and not the primary electronic device 100, the power protection module 130 of the primary electronic device 100 does not experience an overcurrent condition and therefore does not disconnect power supplied to the secondary electronic device 200 via the main branch 310 of the electric harness 300. Additionally, the secondary electronic device 200 works as expected as the inrush current demand is met by the auxiliary electric current 325. Furthermore, it is advantageous that by using the electric harness 300 neither the primary electronic device 100 nor the secondary electronic device 200 has to be modified. Specifically, the primary electronic device 100 does not need to be modified to supply additional current to meet the inrush current demand of the secondary electronic device 200. Additionally, the secondary electronic device 200 does not need to be modified to demand a lower inrush current that would not cause an overcurrent condition at the power protection module 130 of the primary electronic device 100.

Figure 4:
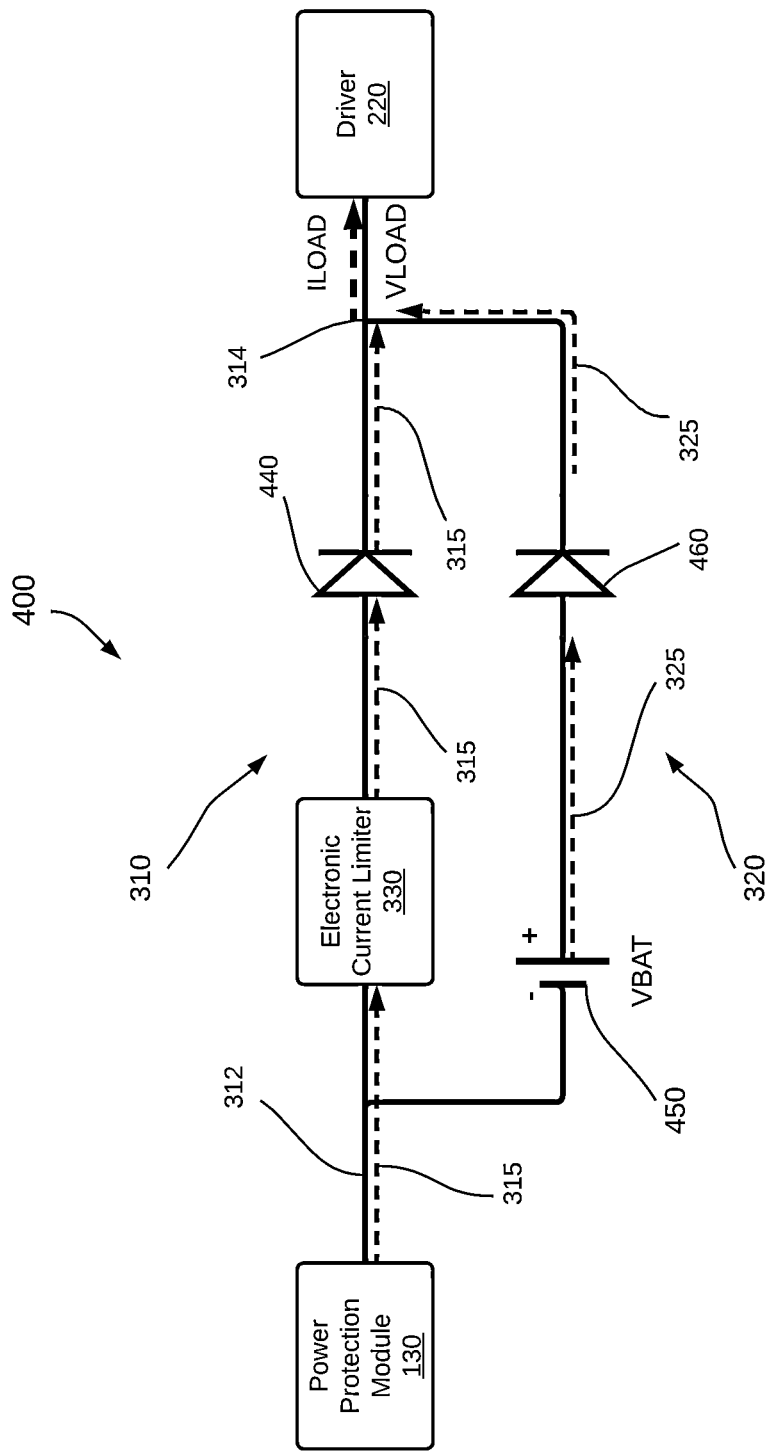
FIG. 4 is a block diagram showing the electric harness of FIG. 3, wherein the electric energy storage device comprises a battery.

In some implementations, the main one-way switch 340 and the auxiliary one-way switch 360 each comprises a diode. In some implementations, the electric energy storage device 350 comprises a battery. Reference is made to FIG. 4 for an implementation of an electric harness 400 in which the electric energy storage device comprises a battery 450, the main one-way switch comprises a main diode 440, and the auxiliary one-way switch comprises an auxiliary diode 460. In FIG. 4, only the power protection module 130 of the primary electronic device is shown and only the driver 220 of the secondary electronic device is shown for brevity and simplicity.

With reference to FIG. 4, the battery 450 can be any suitable type of battery that supplies a battery voltage VBAT which is lower than the load voltage VLOAD at the load end 314 by an amount that guarantees that the auxiliary diode 460 is off under normal current demand, i.e., when the driver 220 only draws a main electric current 315 which can be supplied by the power protection module 130 without the power protection module 130 experiencing an overcurrent condition. By way of example only, if the load voltage VLOAD is 12V, then the battery voltage VBAT can be chosen to be 10V. Minor fluctuations on VLOAD under normal steady-state conditions may bring VLOAD down to 11V. However, even in such condition, the load voltage VLOAD is greater than the battery voltage VBAT which keeps the auxiliary diode 460 in the OFF state.

The main diode 440 and the auxiliary diode 460 can each be a regular PN junction diode. Preferably, the main diode 440 and the auxiliary diode 460 are ideal diode implementations. A PN junction diode works but has a voltage drop that is around 0.6V or 0.7V when it is on. An ideal diode has a miniscule voltage drop of the order of millivolts. An ideal diode may be implemented using an ideal diode controller which is an integrated circuit that incorporates a transistor such as a Metal Oxide Semiconductor Field Effect Transistor (MOSFET) and control circuitry to ensure a low voltage drop across the transistor when the is on, and minimal reverse current when the transistor is off. Ideal diodes incorporating a MOSFET reduce the voltage drop across the MOSFET in linear mode by increasing the gate voltage. One example of an ideal diode controller is the LM74701-Q1 by Texas Instruments™. Another example of an ideal diode controller is the MAX17614 from Analog Devices™ which includes current limiting capabilities and can thus represent both the electronic current limiter 330 and the main diode 440. In some implementations, the auxiliary one-way switch 360 comprises an ideal diode configured for switching on when a load voltage (VLOAD) at the load end 314 is lower than an electric energy storage device voltage of the electric energy storage device 350, and configured for switching off when the load voltage at the load end 314 is higher than the electric energy storage device voltage.

When the driver 220 makes an inrush current demand, the inrush current is, as discussed with respect to FIG. 2, higher than the steady-state current. This causes a voltage drop along the main branch 310 and in the driver 220 circuit. As a result the load voltage VLOAD drops significantly particularly when the inrush current is at a peak current value as shown in FIG. 2. As such the load voltage VLOAD is lower than the battery voltage VBAT and the auxiliary diode 460 turns on. When the auxiliary diode 460 is on, the auxiliary electric current 325 supplied by the battery 450 is supplied to the driver 220. The auxiliary diode 460 is an example implementation of the auxiliary one-way switch 360 of FIG. 3. Generally speaking, the auxiliary one-way switch 360 is configured for switching from the first mode to the second mode when the output voltage at the load end 314 (i.e., the load voltage VLOAD) has dropped below a low output voltage limit (i.e., the limit at which the auxiliary one-way switch 360 or the auxiliary diode 460 turns on).

Both the main electric current 315, which is limited by the electronic current limiter 330, and the auxiliary electric current 325 are supplied to the driver 220 as the load current ILOAD. As discussed above, the electric energy storage device 350 is configured to provide the auxiliary electric current 325 such that the main electric current 315 and the auxiliary electric current together are equal to the load current. The load current is the sum of the main electric current 315 and the auxiliary electric current 325 thus meeting the inrush current demand of the driver 220 of the secondary electronic device 200.

After the inrush current demanded by the driver 220 is met and the load current ILOAD at the load end drops down to a steady state current as shown in FIG. 2, the voltage drop across the main branch 310 is lower as is the voltage drop in the driver 220. As a result the load voltage VLOAD rises to a value which is higher than the battery voltage VBAT. Consequently, the auxiliary diode 460 turns off disconnecting the battery 450 from the load end 314. Generally speaking, the auxiliary one-way switch 360 switches from the second mode to the first mode when the output voltage at the load end 314 (i.e., the load voltage VLOAD) rises above the low output voltage limit (i.e., the voltage limit that causes the auxiliary one-way switch 360 or the auxiliary diode 460 to switch off). Advantageously, the battery 450 is not depleted and the secondary electronic device 200 is not receiving excessive current when such excessive current is not needed.

In some implementations, the inrush current demand made by the secondary electronic device 200 has a limited duration, i.e., or the order of a few tens of milliseconds. In such cases, a battery 450 in the auxiliary branch 320 is not necessary, and the inrush current demand can be met by using a supercapacitor. Accordingly, in such implementations the electric energy storage device comprises a supercapacitor and the auxiliary branch 320 further comprises a charging module for charging the supercapacitor. For example, with reference to FIG. 5, there is shown an electric harness 500 comprising a main branch 310 as described above, and an auxiliary branch. The auxiliary branch has a supercapacitor charger 570, a supercapacitor 550, and the auxiliary diode 460. The electric harness 500 is shown connected to a primary electronic device 100 at the supply end 312 and to a secondary electronic device 200 at the load end 314. In the depicted implementation, the primary electronic device 100 may or may not have a power protection module 130. Similarly, the secondary electronic device 200 may or may not have a driver module. However, as described above the secondary electronic device 200 makes an inrush current demand which the primary electronic device 100 cannot handle without failure. The failure may include an overcurrent condition that causes damage to the primary electronic device 100, or an overcurrent condition that causes a power protection module of the primary electronic device 100 to disconnect power to the secondary electronic device 200. The inrush current demand made by the secondary electronic device 200 may come directly from an electromechanical device in the secondary electronic device 200 or from a driver connected to an electromechanical device of the secondary electronic device 200.

Figure 5:
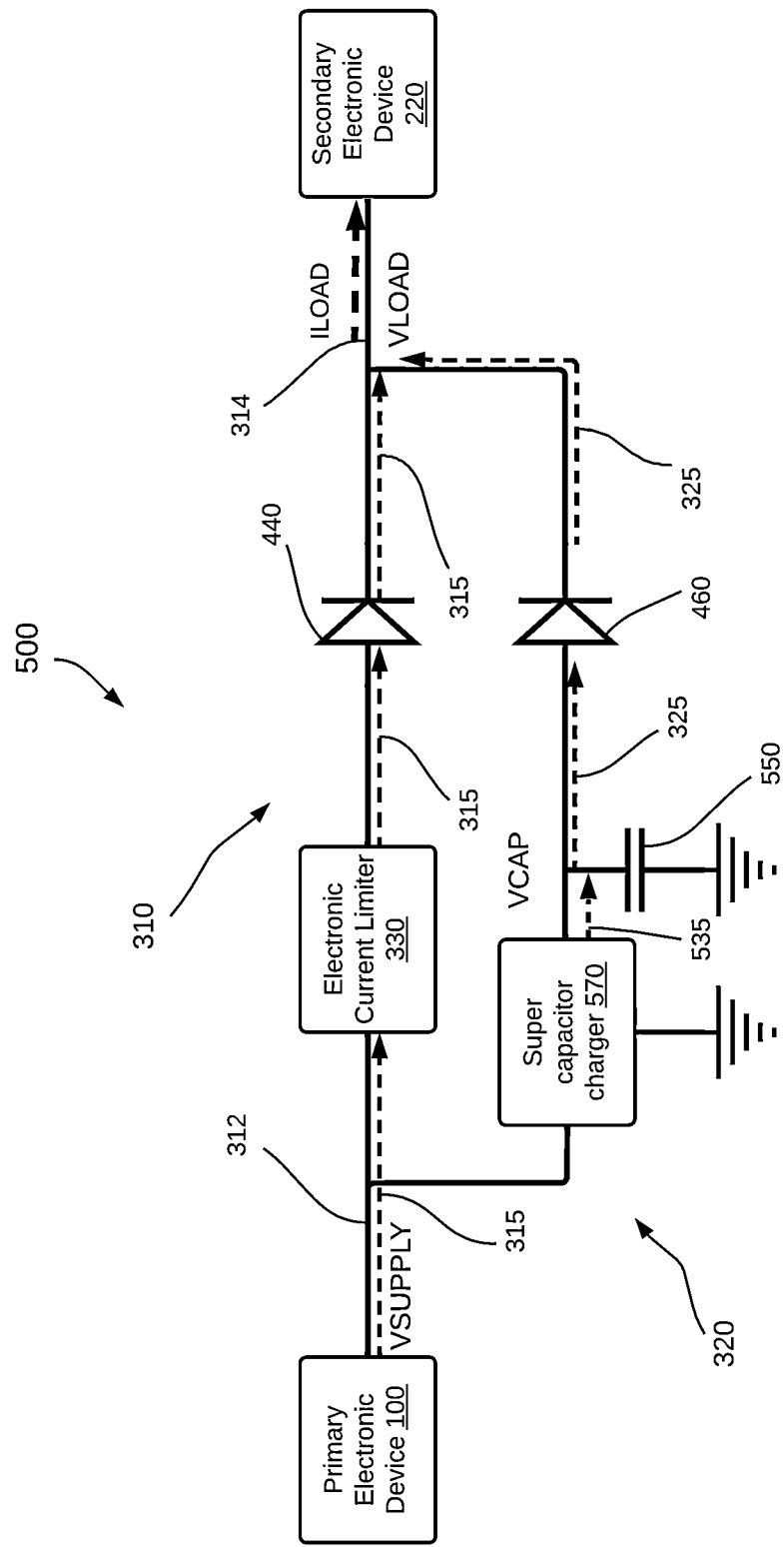
FIG. 5 is a block diagram showing the electric harness of FIG. 3, wherein the electric energy storage device comprises a supercapacitor and the auxiliar branch includes a supercapacitor charger.

The implementation of FIG. 5 relies on a supercapacitor to supply an auxiliary electric current that meets the inrush current demand made by the secondary electronic device. Supercapacitors are electrical energy storage devices that bridge the gap between conventional capacitors and batteries. Supercapacitors have a high power density allowing them to deliver and absorb energy quickly. Additionally, supercapacitors have a long cycle life in that they can be charged and discharged millions of times. This is owing to the fact that supercapacitors store electrical energy via electrostatic charge separation at the interface between an electrolyte and a high surface area electrode material, and the lack of chemical reactions during energy storages as in the case of batteries. Supercapacitors also have fast charging and discharging; therefore they are suitable when an inrush current demand is immediate. However, supercapacitors need to be charged to storage the electrical energy therein.

The supercapacitor 550 shown connected to the auxiliary branch 320 of the electrical harness 500 has a capacitance such that it holds sufficient electrical energy to provide an auxiliary electric current 325, for a limited duration, when an inrush current demand is made by the driver 220 of the secondary electronic device 200. For example, it may be estimated that the secondary electronic device 200 will make an inrush current demand of 300 mA for about 200 ms. As such, the capacitance, and the discharge rate of the supercapacitor 550 are selected so that the supercapacitor 550 can provide the expected inrush current demand of 300 mA for the duration of 200 ms. In some implementations, the supercapacitor 550 is of the order of a few Farads. Examples of the supercapacitor 550 include, but are not limited to, the SVL series supercapacitors from Lelon™.

In order to store electrical energy, the supercapacitor 550 needs to be electrically charged, by a supercapacitor charger 570. The supercapacitor charger 570 is a device specifically designed to charge supercapacitors efficiently and safely. The supercapacitor charger 570 is disposed in the auxiliary branch 320, connected in parallel with the supercapacitor 550, and supplies a charging current 535 to the supercapacitor 550 to charge the supercapacitor 550. The supercapacitor charger 570 controls the charging process to ensure that the supercapacitor 550 is charged to a "regulation voltage" within the supercapacitor voltage limits. A supercapacitor charger's regulation voltage is a configurable voltage to which the supercapacitor charger charges a supercapacitor connected to the output thereof. During charging, the supercapacitor charger 570 monitors the supercapacitor voltage VCAP of the supercapacitor. Once the supercapacitor voltage VCAP on the supercapacitor 550 reaches the regulation voltage, the supercapacitor charger 570 tapers down the charging current 535 to zero and holds the supercapacitor voltage VCAP at the regulation voltage. Several types of supercapacitor chargers include linear regulator chargers, switching regulator chargers, Constant Current/Constant Voltage (CC/CV) chargers, Universal Serial Bus (USB) supercapacitor chargers, and customized charging circuits. Examples of supercapacitor chargers include, but are not limited to, the MAX17701 supercapacitor charger controller from Analog Devices™ and the BQ25173 linear charger for 1- to 4-cell supercapacitor from Texas Instruments™.

In the depicted implementation of FIG. 5, the supercapacitor charger 570 is disposed in the auxiliary branch 320 and is powered by the primary electronic device 100. In operation, the electric harness 500 is first connected to the primary electronic device 100 at the supply end 312 then to the secondary electronic device 200 at the load end 314. Initially, the supercapacitor 550 is fully discharged and has a supercapacitor voltage VCAP of 0V.

When the electric harness 500 is connected at the supply end 312 to the primary electronic device 100 (at the power protection module 130 thereof), the supercapacitor charger 570 charges the supercapacitor 550 to a regulation voltage VCAP. During charging, the supercapacitor voltage VCAP rises from 0V towards the configured regulation voltage.

During charging, the supercapacitor charger 570 draws power from the primary electronic device 100 and supplies the charging current 535 to the supercapacitor 550. When the supercapacitor voltage VCAP reaches the regulation voltage, the supercapacitor charger 570 drops the charging current 535 to zero amperes.

When the load end 314 of the electric harness 500 is connected to the secondary electronic device 200, the voltage at the load end 314 is the load voltage VLOAD. The regulation voltage to which the supercapacitor 550 is charged is lower than the load voltage VLOAD at the load end 314. As such the auxiliary diode 460, which is a one-way switch as discussed above, is OFF thus preventing any auxiliary electric current 325 from passing from the supercapacitor 550 to the load end 314 and hence to the secondary electronic device 200. As such, the supercapacitor 550 remains charged with the charge equivalent to the electric energy stored therein by the supercapacitor charger 570.

When the secondary electronic device 200 makes an inrush current demand, the load voltage VLOAD at the load end 314 drops accordingly as discussed above. When the load voltage VLOAD is lower than the supercapacitor voltage VCAP (which was charged to the regulation voltage), the auxiliary diode 460 turns on and allows the supercapacitor 550 to discharge therethrough. The discharging of the supercapacitor 550 supplies an auxiliary electric current 325 which is added to the main electric current 315 to form the load current ILOAD. The fast discharging of the supercapacitor 550 supplies the auxiliary electric current 325 to the secondary electronic device 200 in a timely manner to power the electromagnetic device that made the inrush current demand.

When the inrush current demand by the secondary electronic device 200 subsides (with reference to FIG. 2, the current demand drops down to the steady-state value), the load voltage VLOAD at the load end 314 rises until the load voltage VLOAD is greater than the supercapacitor voltage VCAP. When the load voltage VLOAD is higher than the capacitor voltage VCAP, the auxiliary diode 460 turns off disconnecting the supercapacitor from the load end 314. As a result, the supercapacitor 550 ceases to discharge and continues to hold electrical energy until the next inrush current demand is made by the secondary electronic device 200. Additionally, as the supercapacitor voltage VCAP may have dropped while the supercapacitor 550 has been discharging, the supercapacitor charger 570 supplies a charging current 535 to bring the supercapacitor voltage VCAP up to the regulation voltage.

In the above implementation of FIG. 5, the regulation voltage to which the supercapacitor voltage VCAP has to be charged is selected such that without an inrush current demand that causes VLOAD to drop, the supercapacitor voltage VCAP is greater lower than VLOAD. At the same time, the regulation voltage has to be selected such that when an inrush current demand by the secondary device takes place VLOAD becomes lower than VCAP. It is estimate that the regulation voltage needs to be within 1V to 2V lower than VLOAD under normal conditions. In some implementations, the supply voltage VSUPPLY supplied by the primary electronic device 100 and the load voltage VLOAD needed by the secondary electronic device 200 are high in value. Accordingly the regulation voltage to which the supercapacitor 550 needs to be charged also needs to be high in value. For example, if the supply voltage VSUPPLY is +12V and VLOAD is +12V (assuming a minimal voltage drop on the main branch 310), then the regulation voltage has to be around 10V-11V. A supercapacitor that holds electric charge at 10V and holds such electric charge as would be enough to provide an auxiliary current in the order of a few hundred milliamperes for a few hundred milliseconds would be a capacitor having a capacitance of a few Farads or more. Having such a large supercapacitor as part of the electric harness 500 would make the electric harness 500 impractically large. For example, a supercapacitor 550 having a capacitance of several Farads and having a voltage rating of 10V would be roughly the size of a soda can. As such, and in order to keep the electric harness 500 of a manageable size, the inventors have proposed a solution wherein the supply voltage VSUPPLY is down converted by a DC/DC downconverter to a lower voltage level, which is used to charge the supercapacitor. Reducing the regulation voltage of the supercapacitor will also reduce the required capacitance for the same charge (Q=V/C; reducing V allows the reduction of C for the same Q). However, since the load voltage VLOAD is close to the supply voltage VSUPPLY, then the voltage after the supercapacitor voltage VCAP needs to be upconverted to VLOAD, by using a DC/DC voltage upconverter. An implementation of an electric harness feature such voltage down conversion and voltage up conversion in the auxiliary branch is depicted in FIG. 6.

Figure 6:
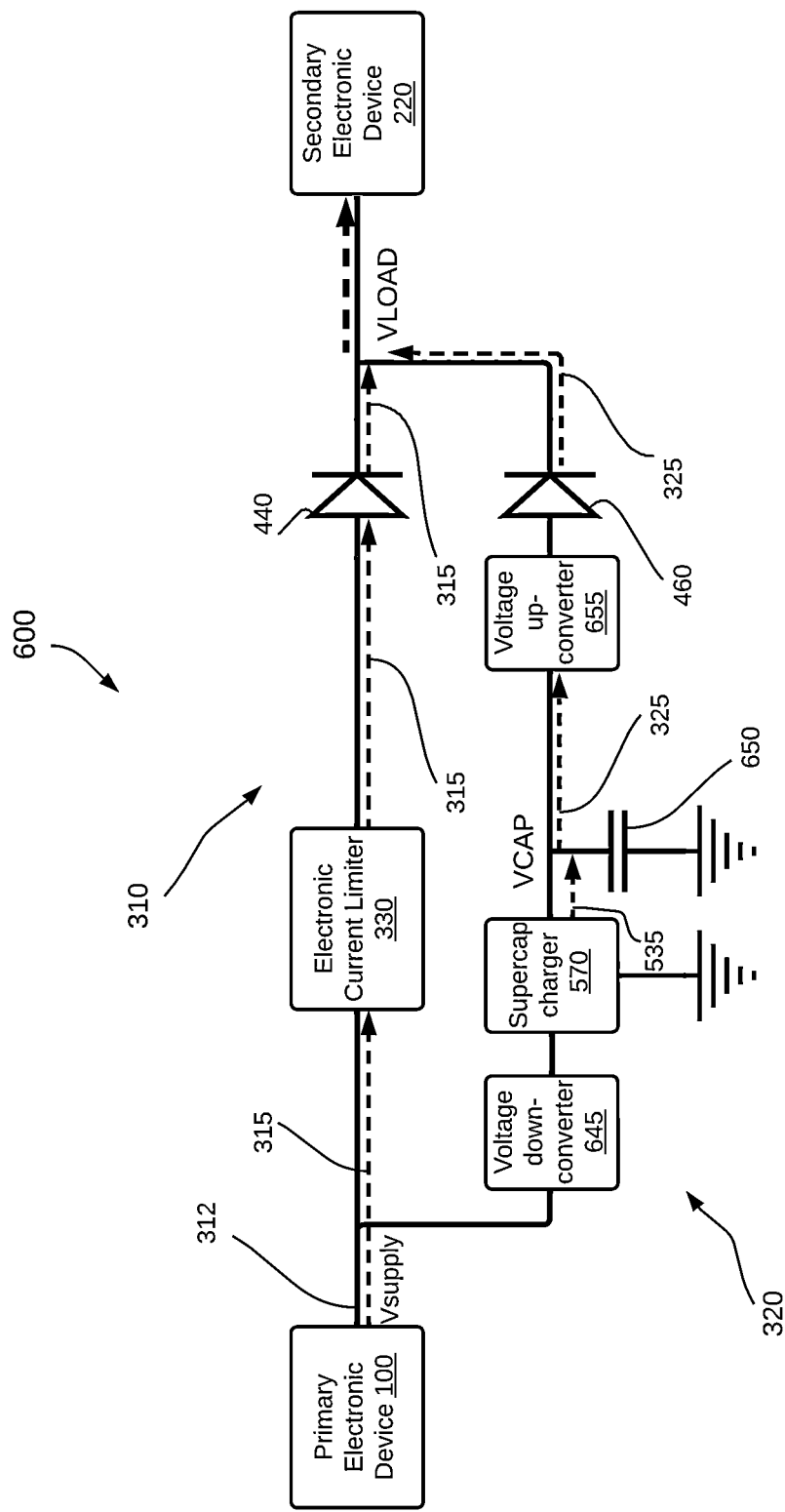
FIG. 6 is a block diagram showing the electric harness of FIG. 5 with the addition of a voltage downconverter and a voltage upconverter in the auxiliary branch.

FIG. 6 depicts an electric harness 600 similar to the electric harness 500 of FIG. 5, but adds a voltage downconverter 645 between the supply end 312 and the supercapacitor charger 570, uses a supercapacitor 650, and adds a voltage upconverter 655 at the output of the supercapacitor 650.

The voltage downconverter 645 is an electronic device that converts a higher voltage to a lower voltage. Examples of the voltage downconverter 645 include, but are not limited to, DC-DC converts (e.g., buck converters, step-down converters), voltage regulators (linear and switching regulators), and buck-boost converters which can both step-up and step-down voltages. In the electric harness 600, the voltage downconverter is used to convert the supply voltage VSUPPLY to a lower voltage used to charged the supercapacitor 550. For example, the supply voltage VSUPPLY may be 12V, and the voltage downconverter 645 converts that voltage down to a lower supercapacitor charging voltage of 5V.

The supercapacitor 650 is rated at the lower voltage supplied at the output of the voltage downconverter 645, and thus has a smaller size as explained above.

The voltage upconverter 655 is an electronic device that converts a lower voltage to a higher voltage. Examples of the voltage upconverter 655 includes, but are not limited to, DC-DC boost converters and boost regulators (linear and switching). The voltage upconverter upconverts the supercapacitor voltage VCAP to the load voltage VLOAD.

Figure 7:
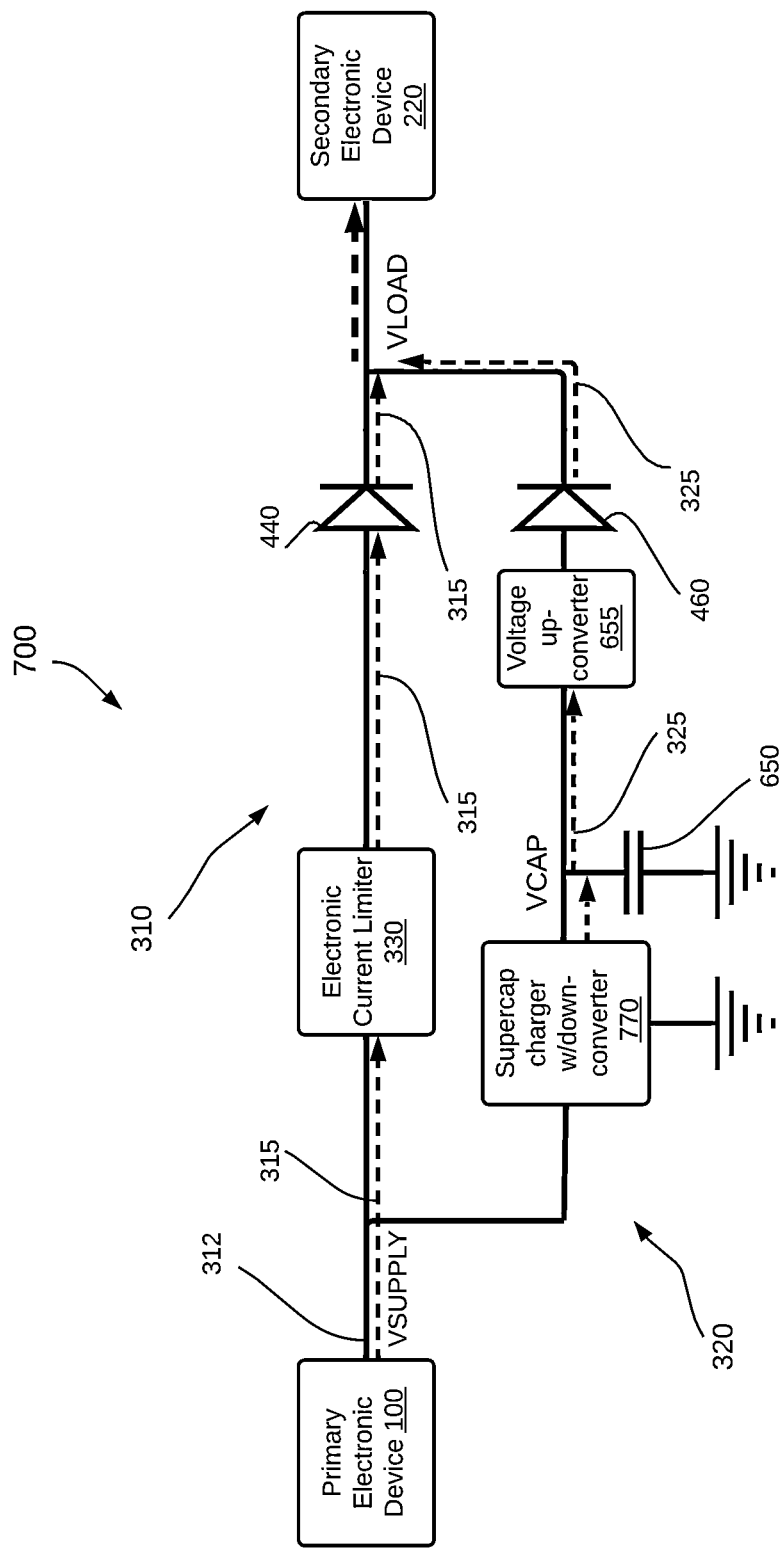
FIG. 7 is a block diagram showing the electric harness of FIG. 6, wherein the supercapacitor charger and the voltage downconverter are integrated together.

In some implementations, the charging module for the supercapacitor is configured for down-converting the supply voltage VSUPPLY at the supply end 312 to a supercapacitor voltage VCAP suitable for the supercapacitor 550. As shown in FIG. 7, the electric harness 700 includes the supercapacitor charger with downconverter 770, which replaces the supercapacitor charger 570 and the voltage downconverter 645.

Figure 8:
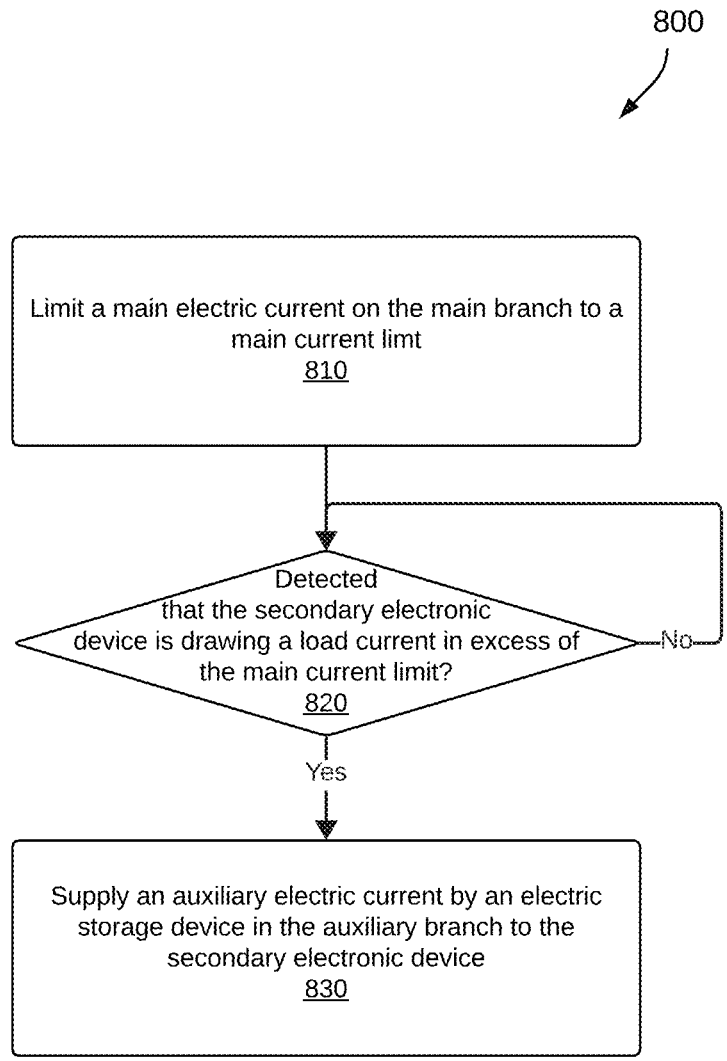
FIG. 8 is a flowchart depicting an exemplary method of supplying electric power from a primary electronic device to a secondary electronic device.

In another aspect of the present disclosure, there is provided a method of supplying electric power from a primary electronic device 100 to a secondary electronic device 200 coupled to the primary electronic device 100 via an electric harness (300, 400, 500, 600, 700) comprised of a main branch 310 and an auxiliary branch 320. FIG. 8 depicts a method 800 of the aforementioned method starting at step 810. The method 800 may be performed by an electric harness such as the electric harness 300, 400, 500, 600, or 700.

At step 810, the main electric current on the main branch of the electric harness is limited to a main current limit. In some implementations, limiting the main electric current to the main current limit comprises limiting the main electric current to an overcurrent limit associated with a power protection module of the primary electronic device. In other implementations, limiting the main electric current to the main current limit comprises limiting the main electric current to an overcurrent limit which would cause damage to the primary electronic device.

At step 820, the electric harness detects whether the secondary electronic device 200 is drawing a load current (ILOAD) in excess of the main current limit. In some implementations, detecting that the secondary electronic device 200 is drawing a load current which is in excess of the main current limit comprises detecting that an output voltage at the load end of the electric harness has dropped below a low output voltage limit. If the electric harness detects that the secondary electronic device 200 is drawing a load current in excess of the main current limit, control goes to step 830. Otherwise, control stays in step 820.

At step 830, the electric harness supplies an auxiliary electric current 325 by an electric energy storage device 350 in the auxiliary branch 320 to the secondary electronic device 200.

In some implementations, supplying the auxiliary electric current 325 comprises closing (i.e., switching on) an auxiliary one-way thus connecting the electric energy storage device 350 to the secondary electronic device 200.

In some implementations, the method further comprises blocking the auxiliary electric current 325 from flowing through the main branch 310 and blocking the main electric current 315 from flowing through the auxiliary branch 320.

In some implementations, the electric energy storage device 350 comprises a battery 450.

In some implementations, the electric energy storage device 350 comprises a supercapacitor (550, 650) and the auxiliary branch 320 comprises a charging module (e.g., a supercapacitor charger 570) for charging the supercapacitor (550, 650). In such implementations, the method 800 may further comprises charging the supercapacitor (550, 650) in response to connecting the electric harness (300, 400, 500, 600, 700) to the primary electronic device 100. In such implementations, supplying the auxiliary electric current comprises discharging the supercapacitor. The method may also include down converting, in the auxiliary branch, a supply voltage at the supply end to a regulation voltage used by the charging module, and upconverting, in the auxiliary branch, the supercapacitor voltage to a load voltage supplied at a load end of the electric harness.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. An electric harness for connecting a primary electronic device to a secondary electronic device, comprising:
 a main branch comprising:
  a supply end for electrically connecting the electric harness to the primary electronic device;
  a load end for electrically connecting the electric harness to the secondary electronic device;
  an electronic current limiter configured to limit a main electric current supplied by the primary electronic device via the supply end, on the main branch, to a main current limit; and
  a main one-way switch configured for passing the main electric current from the electronic current limiter to the load end; and
 an auxiliary branch in parallel with the main branch and connected thereto at the supply end and the load end, the auxiliary branch comprising:
  an electric energy storage device; and
  an auxiliary one-way switch connecting the electric energy storage device to the load end, the auxiliary one-way switch configured to operate in:
   a first mode in which the auxiliary one-way switch is open; and
   a second mode in which the auxiliary one-way switch is closed allowing an auxiliary electric current supplied by the electric energy storage device to flow to the load end while blocking the main electric current from flowing through the auxiliary branch;
  wherein, when the secondary electronic device draws a load current in excess of the main current limit:
   the electronic current limiter limits the main electric current to the main current limit;
   the auxiliary one-way switch operates in the second mode thus allowing the auxiliary electric current to flow through the auxiliary branch to the secondary electronic device; and
   the main electric current and the auxiliary electric current together are equal to the load current.

2. The electric harness of claim 1, wherein the main current limit comprises an overcurrent limit associated with a power protection module of the primary electronic device.

3. The electric harness of claim 1, wherein the main one-way switch is further configured to block the auxiliary electric current from flowing through the main branch.

4. The electric harness of claim 1, wherein the main one-way switch is integrated with the electronic current limiter.

5. The electric harness of claim 1, wherein:
 the electric energy storage device comprises a supercapacitor; and
 the auxiliary branch further comprises a charging module configured for charging the supercapacitor.

6. The electric harness of claim 5, wherein the supercapacitor has a capacitance enabling the supercapacitor to supply the auxiliary electric current for a limited duration.

7. The electric harness of claim 5, wherein the auxiliary branch further comprises:

a voltage downconverter configured for down-converting a supply voltage at the supply end to a supercapacitor voltage used by the charging module to charge the supercapacitor; and a voltage upconverter for up-converting the supercapacitor voltage to a load voltage supplied at the load end.

8. The electric harness of claim 5, wherein:

the charging module is configured for down-converting a supply voltage at the supply end to a supercapacitor voltage suitable for the supercapacitor; and the auxiliary branch further comprises a voltage upconverter for up-converting the supercapacitor voltage to a load voltage supplied at the load end.

9. The electric harness of claim 1, wherein the auxiliary one-way switch is configured to switch from the first mode to the second mode in response to the secondary electronic device drawing a load current at the load end, which is in excess of the main current limit.

10. The electric harness of claim 1, wherein the auxiliary one-way switch is configured for:

switching from the first mode to the second mode when an output voltage at the load end has dropped below a low output voltage limit; and switching from the second mode to the first mode when the output voltage at the load end rises above the low output voltage limit.

11. The electric harness of claim 1, wherein the auxiliary one-way switch comprises an ideal diode configured for:

switching on when a load voltage at the load end is lower than an electric energy storage device voltage of the electric energy storage device; and switching off when the load voltage at the load end is higher than the electric energy storage device voltage.

* * * * *